United States Patent [19]

Han

[11] Patent Number: 4,792,586

[45] Date of Patent: Dec. 20, 1988

[54] IMPACT STRENGTH OF POLYPHENYLENE ETHER-LINEAR POLYESTER ARTICLES

[75] Inventor: Choong Y. Han, Evansville, Ind.

[73] Assignee: General Electric Company, Schenectady, N.Y.

[21] Appl. No.: 933,429

[22] Filed: Nov. 21, 1986

[51] Int. Cl.[4] .............................................. C08L 53/00

[52] U.S. Cl. ...................................... 525/88; 264/235; 525/64; 525/68; 525/92; 525/123; 525/124

[58] Field of Search ................... 525/92, 98, 392, 905, 525/88, 64, 68, 123, 124; 264/235

[56] References Cited

U.S. PATENT DOCUMENTS 4,123,410 10/1978 Lee, Jr. ............................ 525/92 X 4,614,773 9/1986 Sugio et al. ......................... 525/391

*Primary Examiner*—Theodore E. Pertilla

*Attorney, Agent, or Firm*—William H. Pittman; James C. Davis, Jr.; James Magee, Jr.

[57] ABSTRACT

Molded articles are prepared from a blend of polyphenylene ether, linear polyester, elastomeric impact modifier and a polyisocyanate or masked polyisocyanate and are then annealed at a temperature above the glass transition temperature of the polyester, in order to increase the impact strength thereof. The preferred polyphenylene ethers are functionalized or unfunctionalized poly(2,6-dimethyl-1,4-phenylene ethers), and the preferred polyesters are poly(ethylene terephthalates) and poly(1,4-butylene terephthalates).

15 Claims, No Drawings

IMPACT STRENGTH OF POLYPHENYLENE ETHER-LINEAR POLYESTER ARTICLES

This invention relates to the preparation of resinous articles of high impact strength, and in particular to the preparation of such articles from compositions comprising polyphenylene ethers and linear polyesters.

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the linear polyesters, especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

Copending, commonly owned application Ser. No. 122,480, filed Nov. 10, 1987 discloses polyphenylene etherpoly(alkylene dicarboxylate) compositions with improved impact strength, as a result of the presence therein of polyphenylene ether-poly(alkylene dicarboxylate) copolymers. Numerous methods of preparing such copolymers are disclosed, certain of which involve the linking of the two polymers with polyisocyanates and masked polyisocyanates.

While the homogeneity of molded articles containing polyisocyanate-linked copolymers of this type is markedly improved, it is frequently found that the impact strengths of such molded articles are still undesirably low. Therefore, methods for increasing impact strength are frequently advantageous. Such a method is provided by the present invention.

In various aspects, the invention is directed to a method for preparing a molded article of high impact strength and to molded articles so prepared. Said method comprises the steps of:

(A) preparing an intimate blend comprising about 20–60% by weight of at least one polyphenylene ether, about 25–65% of at least one linear polyester, about 1–10% of at least one polyisocyanate or masked polyisocyanate and about 2–20% of at least one elastomeric impact modifier;

(B) molding said blend at a temperature within the range of about 250°–350° C. to produce a molded article which comprises a polyphenylene ether-polyester copolymer; and (C) annealing said molded article at a temperature above the glass transition temperature of said polyester, for a time effective to increase the impact strength thereof.

The polyphenylene ethers (also known as polyphenylene oxides) used in the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

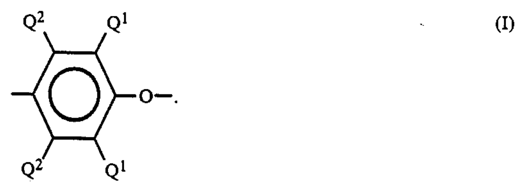

(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6 -dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes. o-hydroxyazo compounds and ω-hydroxyoximes.

Among the polyphenylene ethers which are useful for the purposes of this invention are those which comprise molecules having at least one of the end groups of the formulas

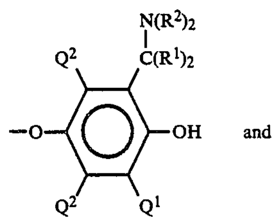

and (II)

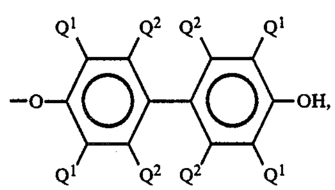

(III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

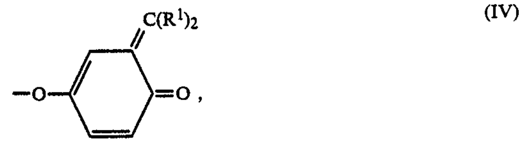

(IV)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

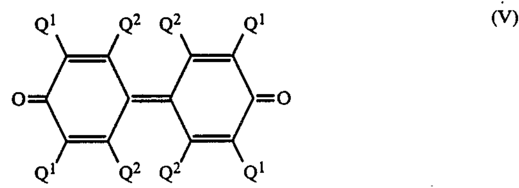

(V)

is present, especially in a copper-halide-secondary or tertiary amine system. In this regard, the disclosures of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of functionalized polyphenylene ethers is also contemplated. These may be prepared by the reaction of at least one functionalizing agent with a polyphenylene ether. The functionality of the functionalized polyphenylene ether may be present on the end group; for example, as a result of reaction with the phenolic terminal hydroxy group. The hydroxy group in an end group having formula IV is preferred because of its relative thermal stability. Functionalization may also involve one of the aromatic rings in the polymer chain, or an alkyl group attached thereto.

One method of functionalizing the polyphenylene ether is by reaction with at least one compound containing (a) a carbon-carbon double or triple bond, hydroxy group, alkoxy group, aryloxy group or acyl halide group, and also (b) a carboxylic acid, acid salt, acid anhydride, acid amide, acid ester or imido group. A wide variety of such compounds are suitable for use in the invention. Many illustrative compounds are listed in U.S. Pat. No. 4,315,086 and in copending, commonly owned application Ser. No. 885,497, filed July 14, 1986, the disclosures of which are incorporated by reference herein. They include maleic, fumaric, itaconic and citraconic acids and their derivatives, various unsaturated fatty oils and the acids derived therefrom, relatively low molecular weight olefinic acids such as acrylic acid and its homologs, and the like.

Other functionalizing agents of this type are the aliphatic polycarboxylic acids and derivatives thereof disclosed in copending, commonly owned application Ser. No. 736,489, filed May 20, 1985, and corresponding PCT published application 85/5372. These compounds may be represented by the formula

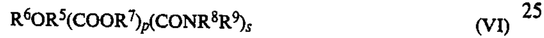

$$R^6OR^5(COOR^7)_p(CONR^8R^9)_s \qquad \text{(VI)}$$

wherein $R^5$ is a linear or branched chain saturated aliphatic hydrocarbon of from 2 to 20, preferably 2 to 10, carbon atoms; $R^6$ is hydrogen or an alkyl or aryl group of 1 to 10, preferably 1 to 6, most preferably 1 to 4, carbon atoms, especially hydrogen; each $R^7$ is independently hydrogen or an alkyl or aryl group of from 1 to 20 carbon atoms, preferably from 1 to 10 carbon atoms; each $R^8$ and $R^9$ is independently hydrogen or an alkyl or aryl group of from 1 to 10, preferably from 1 to 6, most preferably 1 to 4, carbon atoms; p and s are each greater than or equal to zero and p+s is at least 2, preferably 2 or 3; and wherein $OR^6$ is alpha or beta to a carbonyl group and at least two carbonyl groups are separated by 2 to 6 carbon atoms.

Illustrative of suitable polycarboxylic acids of this type are citric acid, malic acid, and agaricic acid. Their esters, amides and salts may also be used.

Still another class of these functionalizing agents is disclosed in U.S. Pat. No. 4,600,741, the disclosure of which is also incorporated by reference herein. Illustrative compounds within this class are represented by the formula $$X^1-\overset{\overset{\displaystyle O}{\|}}{C}-R^{10}-X^2, \qquad \text{(VII)}$$

wherein $R^{10}$ is an aromatic or saturated aliphatic radical, $X^1$ is halogen (especially chlorine) and $X^2$ is one or two carboxylic acid, acid salt, acid amide or acid ester groups or a dicarboxylic acid anhydride or imide group. Illustrative compounds of this type are carboxymethylsuccinic anhydride acid chloride and trimellitic anhydride acid chloride (TAAC).

Particularly preferred functionalizing agents from this class are maleic acid and its derivatives (especially maleic anhydride), fumaric acid and trimellitic anhydride acid chloride.

These functionalizing agents may be reacted with the polyphenylene ether by heating a mixture thereof, typically at a temperature within the range of about 80°-390° C., in solution or in the melt and preferably the latter. In general, about 0.01-2.0, most often about 0.3-1.0 and preferably about 0.5-1.0 parts (by weight) of said functionalizing agent is employed per 100 parts of polyphenylene ether. The reaction may conveniently be carried out in an extruder or similar equipment.

The preparation of functionalized polyphenylene ethers for use in the invention is illustrated by the following examples. In these and other examples herein, all parts are by weight.

EXAMPLE 1

A solution of 100 parts of a poly-(2,6-dimethyl-1,4-phenylene ether) having a number average molecular weight of about 20,000 and an intrinsic viscosity in chloroform at 25° C. of 0.48 dl./g., 2 parts of TAAC and 5 parts of dimethyl-n-butylamine in 500 parts of toluene was heated at 95° C. for 3 hours, with stirring. The product was precipitated by addition of methanol, redissolved in toluene and reprecipitated, and dried under reduced pressure. It was shown by infrared spectroscopy to be the desired anhydride-functionalized polyphenylene ether.

EXAMPLE 2

A mixture of 99 parts of the polyphenylene ether used as a reactant in Example 1 and 1 part of maleic anhydride was extruded on a single-screw extruder at temperatures in the range of 120°-330° C. The extrudate, comprising an anhydride-functionalized polyphenylene ether, was quenched in water, pelletized, dissolved in chloroform, precipitated with methanol, filtered and vacuum dried at 60° C.

The linear polyesters usually comprise structural units of the formula

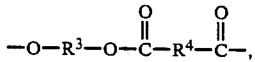

$$-O-R^3-O-\overset{\overset{\displaystyle O}{\|}}{C}-R^4-\overset{\overset{\displaystyle O}{\|}}{C}-,$$

wherein each of $R^3$ and $R^4$ is a divalent aliphatic, alicyclic or aromatic radical containing about 2-10 carbon atoms. At least about 30 of said units are usually present, with at least about 50 being preferred.

Such linear polyesters are typically prepared by the known reaction of dihydroxy compounds with dicarboxylic acids or functional derivatives thereof such as anhydrides, acid chlorides or lower alkyl (especially methyl) esters, preferably the esters.

The $R^3$ radicals may be one or more aliphatic, alicyclic or aromatic radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol, 2-butene-1,4-diol, resorcinol, hydroquinone and bisphenol A. They may also be radicals containing substituents which do not substantially alter the reactivity of the dihydroxy compound (e.g., alkoxy, halo, nitrile) or hetero atoms (e.g., oxygen or sulfur). The $R^3$ radicals are usually saturated aliphatic radicals.

The $R^4$ radicals may be derived from such acids as succinic, adipic, maleic, isophthalic and terephthalic acids or similar substituted and hetero atom-containing acids. It usually contains about 6-10 carbon atoms.

Most often, $R^3$ and $R^4$ are hydrocarbon radicals. Preferably, $R^3$ is aliphatic and $R^4$ is aromatic. The polyester is most desirably a poly(alkylene terephthalate), particularly poly(ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

The polyesters preferably have number average molecular weights in the range of about 10,000–70,000, as determined by gel permeation chromatography or by intrinsic viscosity (IV) at 30° C. in a mixture of 60% (by weight) phenol and 40% 1,1,2,2-tetrachloroethane.

It is also contemplated to employ elastomeric polyesters. Such polyesters are known in the art; they are exemplified by compositions in which a portion of the $R^3$ values are soft segment radicals such as polyoxyalkylene (typically polyoxyethylene or polyoxytetramethylene) and units derived from lactones such as ε-caprolactone. Numerous elastomeric polyesters of this type are commercially available; they include those sold by DuPont under the trademark HYTREL and by General Electric under the trademark LOMOD.

In step A of the method of this invention, an intimate blend is prepared which includes the above-described polyphenylene ether, polyester and at least one polyisocyanate or masked polyisocyanate. Illustrative polyisocyanates include hexamethylene diisocyanate, toluene diisocyanate, tris(6-isocyanatohexyl) isocyanurate, bis(4-isocyanatophenyl)methane and 2,4-bis(4-isocyanatophenylmethyl)phenyl isocyanate. Masked polyisocyanates, illustrated by azelaoylbis(propylene urea), are also useful since they generate polyisocyanates on heating. All of such compounds are hereinafter sometimes designated "isocyanates"0 for brevity.

Also present in the blend is at least one elastomeric impact modifier which is compatible with the polyphenylene ether. Suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; copolymers (usually block or graft) of alkenylaromatic compounds such as styrene and/or epoxy compounds such as glycidyl methacrylate with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in copending, commonly owned application Ser. No. 811,808, filed Dec. 20, 1985, now U.S. Pat. No. 4,681,915.

The preferred impact modifiers are block (typically diblock, triblock or radial teleblock) copolymers of alkenylaromatic compounds and conjugated dienes. Most often, at least one block is derived from styrene and at least one other block from at least one of butadiene and isoprene. Especially preferred are the triblock copolymers with polystyrene end blocks and diene-derived midblocks. It is frequently advantageous to reduce the aliphatic unsaturation therein by selective hydrogenation of the diene blocks. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

The blend prepared in step A includes about 20–60% by weight, preferably about 25–50%, of polyphenylene ether; about 25–65%, preferably about 35–60%, of polyester; about 2–20%, preferably about 10–15%, of impact modifier and about 1–10% of isocyanate. In general, somewhat less isocyanate is required when the polyester is entirely or partially poly(ethylene terephthalate) than when it is entirely poly(butylene terephthalate). Also, somewhat lower proportions of aromatic isocyanates than of aliphatic isocyanates are generally required to effect a substantial improvement in impact strength upon annealing. However, blends containing aromatic isocyanates have a greater tendency to delaminate than those containing aliphatic isocyanates.

For the most part, blends containing less than about 1% isocyanate have very low impact strengths which are not materially improved upon annealing. Preferably, at least about 3% isocyanate is employed. On the other hand, isocyanate proportions above about 10% cause little improvement in impact strength. Similarly, impact modifier proportions below about 2% accomplish little in impact strength improvement, while no particular advantage is noted as a result of amounts greater than about 20%.

The blend of step A may be produced by any known method of intimately blending resinous components. Solution blending and melt blending, the latter normally being achieved by extrusion, are illustrative. Also, any order of blending may be employed. It is frequently convenient to initially dry blend the polyphenylene ether and isocyanate, typically by tumble mixing or an equivalent operation, followed by addition of the polyester and impact modifier and extrusion.

It is frequently found that drying of the extrudate, usually in vacuum at a temperature in the range of about 50°–150° C., causes an increase in the impact strength of molded parts. However, a further increase is usually noted upon annealing as described hereinafter.

Other conventional ingredients which may be present in the blend include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate.

In step B, the blend prepared in step A is molded at a temperature within the range of about 250°–350° C. The molding conditions are conventional and may be chosen according to the type of product desired. Injection molding and compression molding are illustrative.

One effect of step B is to cause reaction between the polyphenylene ether, polyester and isocyanate to produce a polyphenylene ether-polyester copolymer. Said copolymer serves as a compatibilizing agent for said polyphenylene ether and polyester. It constitutes only part of the composition; the approximate proportion thereof may often be conveniently expressed as the percentage of copolymerized polyphenylene ether based on total polyester. Said percentage may be determined if desired by extracting unreacted polyphenylene ether with a suitable solvent, typically toluene, and analyzing the insoluble residue (copolymer and residual polyester) by proton nuclear magnetic resonance.

As previously observed, the molded articles which are the product of step B frequently have undesirably low impact strengths. Accordingly, in step C said articles are annealed at a temperature above the glass transition temperature of the polyester. Exemplary annealing temperatures are in the range of about 80°-150° C. for poly(ethylene terephthalate) and in the range of about 110°-150° C. for poly(butylene terephthalate).

The annealing time employed in step C is not critical, provided it is effective to increase the impact strength of the molded article. In general, times in the range of about 1-24 hours, especially about 1-5 and most desirably about 2-5 hours are satisfactory.

The invention is illustrated by the following examples. The following designations are used for blend constituents:

"Unfunc."—the polyphenylene ether used as a reactant in Examples 1-2.

PBT(50,000) and PBT(25,000)—polybutylene terephthalates having number average molecular weights, as determined by gel permeation chromatography, of about 50,000 and 25,000, respectively.

PET(0.74) and PET(1.04)—polyethylene terephthalates having intrinsic viscosities at 30° C. of 0.74 and 1.04 dl./g., respectively, in a 3:2 (by weight) mixture of phenol and 1,1,2,2-tetrachloroethane.

LOMOD—a polycaprolactone-based elastomeric polyester.

HYTREL—an elastomeric polyester commercially available from DuPont.

THDI—tris(6-isocyanatohexyl) isocyanurate.

IPPI—2,4-bis(4-isocyanatophenylmethyl)phenyl isocyanate.

EXAMPLES 3-10

Polyphenylene ethers and various isocyanates were preblended in a Henschel mixer. The resulting preblend was tumble-mixed on a jar mill for ½ hour with polybutylene terephthalate and a commercially available triblock copolymer in which the polystyrene endblocks have weight average molecular weight of 29,000 and the selectively hydrogenated butadiene midblock has a weight average molecular weight of 116,000. The blends were extruded at 265° C. on a non-vacuum-vented twin screw Welding Engineers 20 mm. extruder at a screw speed of 400 rpm. The extrudate was dried and was molded at 280°-330° C. and 120-134 kg./cm.$^2$. The mold temperature was 82° C. and the total cycle time was 17 seconds.

The compositional details of the molded blends are given in Table I.

TABLE I

| Ingredient | Example 3 | 4 | 5 | 6 | 7 | 8 | 9 | 10 |
|---|---|---|---|---|---|---|---|---|
| Polyphenylene ether: | | | | | | | | |
| Unfunc. | 42 | 42 | — | — | 41 | 40 | 42.5 | 42 |
| Example 1 | — | — | 42 | — | — | — | — | — |
| Example 2 | — | — | — | 40.5 | — | — | — | — |
| Polyester: | | | | | | | | |
| PBT(50,000) | — | 42 | — | — | — | — | — | — |
| PBT(25,000) | 42 | — | 42 | 40.5* | 41 | 40 | 42.5 | 42 |
| Impact modifier | 12 | 12 | 12 | 10 | 12 | 12 | 12 | 12 |
| Isocyanate: | | | | | | | | |
| THDI | 4 | 4 | 4 | 9 | 6 | 8 | — | — |
| IPPI | — | — | — | — | — | — | 3 | 4 |

*High carboxylate end group concentration, produced by preextrusion.

EXAMPLES 11-17

The procedure of Examples 3-10 was repeated, substituting various polyesters for the poly(butylene terephthalate). The compositional details are given in Table II.

TABLE II

| Ingredient | Example 11 | 12 | 13 | 14 | 15 | 16 | 17 |
|---|---|---|---|---|---|---|---|
| Polyphenylene ether: | | | | | | | |
| Unfunc. | 42 | — | 43 | 41 | 40 | 42 | 42 |
| Example 1 | — | 42 | — | — | — | — | — |
| Polyester: | | | | | | | |
| PET(0.74) | 42 | 42 | 43 | 41 | 40 | | |
| LOMOD | — | — | — | — | — | 42 | — |
| HYTREL | — | — | — | — | — | — | 42 |
| Impact modifier | 12 | 12 | 10 | 12 | 12 | 12 | 12 |
| THDI | 4 | 4 | 4 | 6 | 8 | 4 | 4 |

EXAMPLES 18-27

The procedure of Example 3-10 was repeated, substituting PET (1.04) for the polybutylene terephthalate. The compositional details are given in Table III.

TABLE III

| Example | Unfunc. | PET(1.04) | Impact modifier | THDI |
|---|---|---|---|---|
| 18 | 42.5 | 42.5 | 12 | 3 |
| 19 | 42 | 42 | 12 | 4 |
| 20 | 44 | 44 | 8 | 4 |
| 21 | 43 | 43 | 10 | 4 |
| 22 | 41 | 41 | 14 | 4 |
| 23 | 50 | 34 | 12 | 4 |
| 24 | 46 | 38 | 12 | 4 |
| 25 | 38 | 46 | 12 | 4 |
| 26 | 34 | 50 | 12 | 4 |
| 27 | 28 | 56 | 12 | 4 |

EXAMPLES 28-31

The procedure of Examples 3-10 was repeated, employed as the polyester constituent various combinations of PBT (25,000) and PET (1.04). The compositional details are given in Table IV.

TABLE IV

| Ingredient | 28 | 29 | 30 | 31 |
|---|---|---|---|---|
| Polyphenylene ether: | | | | |
| Unfunc. | 42 | 42 | 42 | 43 |
| Polyester: | | | | |
| PBT(25,000) | 31.5 | 21 | 10.5 | 10.75 |
| PET(1.04) | 10.5 | 21 | 31.5 | 32.25 |
| Impact modifier | 12 | 12 | 12 | 12 |
| Isocyanate: | | | | |
| THDI | 4 | 4 | 4 | — |
| IPPI | — | — | — | 2 |

EXAMPLE 32

Molded Izod test specimens prepared by the methods of Examples 3-22 and 28-31 were subjected to the notched Izod impact test (ASTM procedure D256). They were then annealed at 120° C. for 4 hours and again tested. The results are given in Table V.

TABLE V

| Example | Izod impact strength, joules/m. | |
|---|---|---|
| | Original | Annealed |
| 3 | 21.4 | 154.9 |
| 4 | 21.4 | 106.8 |
| 5 | 101.5 | 251.0 |
| 6 | 26.7 | 582.1 |
| 7 | 32.0 | 267.0 |
| 8 | 32.0 | 192.2 |
| 9 | 53.4 | 806.3 |
| 10 | 32.0 | 806.3 |
| 11 | 208.3 | 769.0 |
| 12 | 106.8 | 186.9 |
| 13 | 122.8 | 769.0 |
| 14 | 90.8 | 763.6 |
| 15 | 80.1 | 742.3 |
| 16 | 53.4 | 218.9 |
| 17 | 325.7 | 352.4 |
| 18 | 251.0 | 817.0 |
| 19 | 202.9 | 726.2 |
| 20 | 197.6 | 309.7 |
| 21 | 267.0 | 769.0 |
| 22 | 427.2 | 817.0 |
| 28 | 64.1 | 769.0 |
| 29 | 53.4 | 790.3 |
| 30 | 101.5 | 822.4 |
| 31 | 443.2 | 806.3 |

EXAMPLE 33

Molded Izod test specimens prepared by the methods of various examples were tested in accordance with Example 32, annealed at various temperatures for various time periods and again tested. The results are given in Table VI (impact strengths in joules/m.).

TABLE VI

| Example | Time, hrs. | Temperature, °C. | | | |
|---|---|---|---|---|---|
| | | 60 | 80 | 90 | 120 |
| 7 | 0 | — | — | — | 32.0 |
| | 1 | — | — | — | 48.1 |
| | 3 | — | — | — | 160.2 |
| | 5 | — | — | — | 267.0 |
| 13 | 0 | 122.8 | — | 122.8 | 122.8 |
| | 1 | — | — | | 363.1 |
| | 3 | — | — | 229.6 | 763.6 |
| | 5 | — | — | — | 769.0 |
| | 6 | 122.8 | — | 389.8 | — |
| | 24 | 170.9 | — | 763.6 | — |
| 21 | 0 | 267.0 | — | 267.0 | 267.0 |
| | 1 | — | — | — | 758.3 |
| | 3 | 272.3 | — | 763.6 | 758.3 |
| | 5 | — | — | — | 769.0 |
| | 6 | 320.4 | — | 758.3 | — |
| | 24 | 437.9 | — | 758.3 | — |
| 23 | 0 | — | 405.8 | — | 405.8 |
| | 1 | — | 576.7 | — | 875.8 |
| 24 | 0 | — | 421.9 | — | 421.9 |
| | 1 | — | 587.4 | — | 891.8 |
| 25 | 0 | — | 432.5 | — | 432.5 |
| | 1 | — | 726.2 | — | 1019.9 |
| 26 | 0 | — | 555.3 | — | 555.3 |
| | 1 | — | 817.0 | — | 1041.3 |
| 27 | 0 | — | 811.7 | — | 811.7 |
| | 1 | — | 1105.4 | — | 1164.1 |

From Tables V and VI, it is apparent that annealing at a temperature above the glass transition temperature of the polyester, in accordance with the present invention, uniformly increases the impact strength of molded articles. On the other hand, annealing at lower temperature such as 60° C. for a period up to 6 hours has no appreciable effect, and even when continued for 24 hours has a relatively insignificant effect.

EXAMPLE 34

Blends identical to that of Example 21 were prepared by extrusion, vacuum dried for various times and at various temperatures and molded. The parameters and impact strengths of the molded parts are given in Table VII.

TABLE VII

| Drying conditions | | Molding | Izod impact strength, joules/m | |
|---|---|---|---|---|
| Temperature, °C. | Time, hrs. | temperature, °C. | Original | Annealed |
| 70 | 2 | 280 | 267.0 | 806.3 |
| 120 | 3.5 | 280 | 411.2 | 785.0 |
| 120 | 24 | 300 | 571.4 | 806.3 |

What is claimed is:

1. A molded article of high impact strength prepared by the method which comprises the steps of:

(A) preparing an intimate blend comprising about 20-60% by weight of at least one polyphenylene ether; about 25-65% of at least one linear polyester comprising at least 30 structural units of the formula

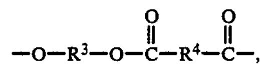

wherein each of $R^3$ and $R^4$ is a divalent aliphatic, alicyclic or aromatic radical containing about 2-10 carbon atoms; about 1-10% of at least one polyisocyanate or masked polyisocyanate and about 2-20% of at least one elastomeric impact modifier;

(B) molding said blend at a temperature within the range of about 250°-350° C. to produce said molded article; and (C) annealing said molded article at a temperature above the glass transition temperature of said polyester, for a time effective to increase the impact strength thereof.

2. An article according to claim 1 wherein the polyphenylene ether comprises a plurality of structural units having the formula

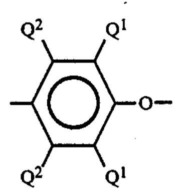

(I)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. An article according to claim 2 wherein the impact modifier is a block copolymer wherein at least one block is derived from styrene and at least one other block from at least one of butadiene and isoprene.

4. An article according to claim 3 wherein the diene blocks have been selectively hydrogenated.

5. An article according to claim 2 wherein the blend of step A contains about 25–50% by weight of polyphenylene ether, about 35–60% of polyester, about 3–10% of polyisocyanate or masked polyisocyanate and about 10–15% of impact modifier.

6. An article according to claim 5 wherein the polyphenylene ether is a poly(2,6-dimethyl-1,4-phenylene ether).

7. An article according to claim 4 wherein the polyester is a poly(ethylene terephthalate).

8. An article according to claim 4 wherein the polyester is a poly(1,4-butylene terephthalate).

9. An article according to claim 6 wherein the polyisocyanate is aliphatic.

10. An article according to claim 6 wherein the polyisocyanate is aromatic.

11. An article according to claim 6 wherein the polyisocyanate is tris(6-isocyanatohexyl) isocyanurate.

12. An article according to claim 6 wherein the polyisocyanate is 2,4-bis(4-isocyanatophenylmethyl)phenyl isocyanate.

13. An article according to claim 6 wherein the polyphenylene ether has been functionalized by reaction with maleic anhydride, fumaric acid or trimellitic anhydride acid chloride.

14. An article according to claim 13 wherein the polyester is a poly(ethylene terephthalate).

15. An article according to claim 13 wherein the polyester is a poly(1,4-butylene terephthalate).

* * * * *